July 2, 1957  J. T. LEWIS  2,797,485
PISTON ROD ALIGNING AND CHECKING FIXTURE
Filed April 15, 1954  2 Sheets-Sheet 1

INVENTOR.
JOHN T. LEWIS
BY Knox & Knox
Agents

July 2, 1957  J. T. LEWIS  2,797,485
PISTON ROD ALIGNING AND CHECKING FIXTURE
Filed April 15, 1954  2 Sheets-Sheet 2
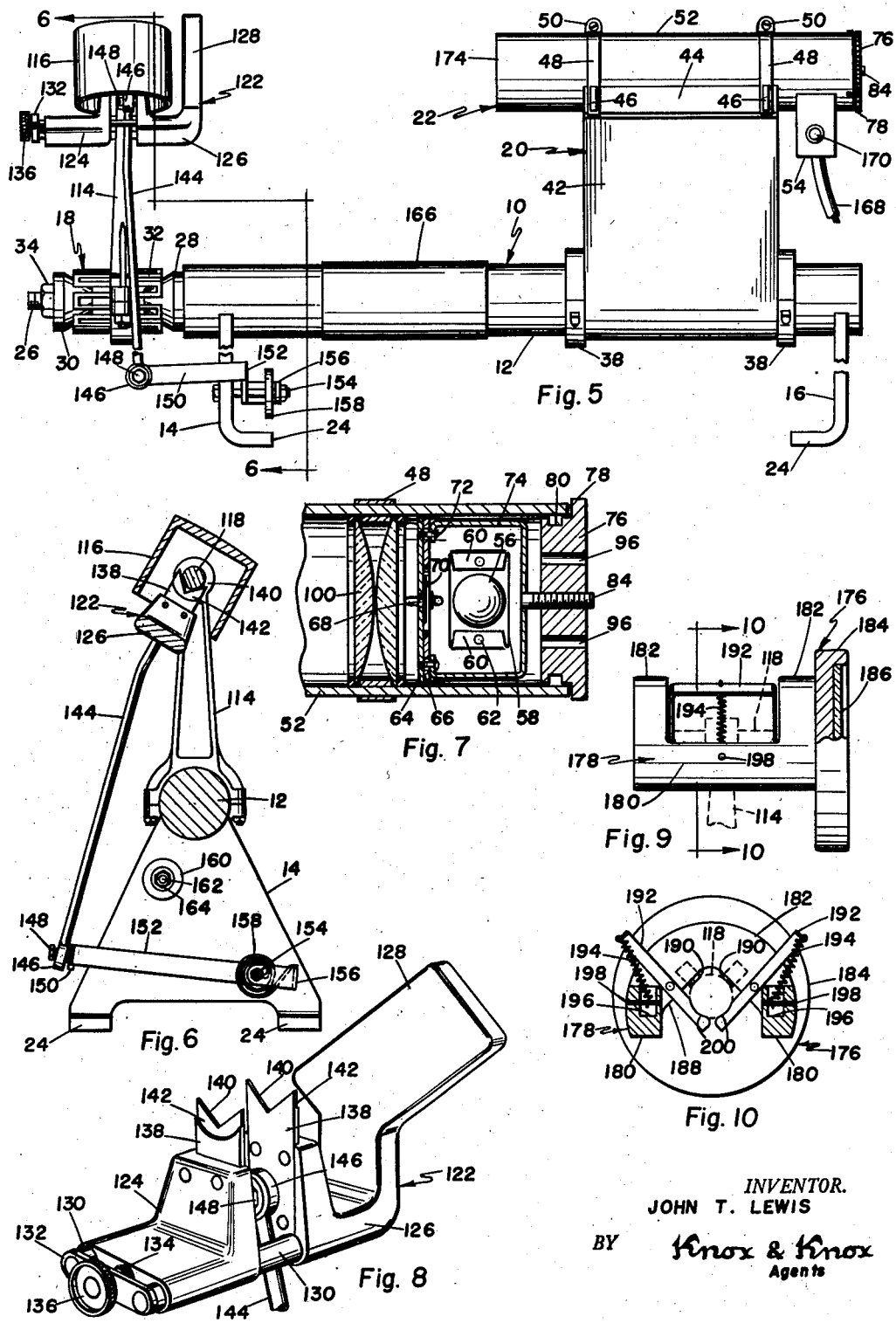
INVENTOR.
JOHN T. LEWIS
BY Knox & Knox
Agents

United States Patent Office 2,797,485
Patented July 2, 1957

2,797,485

PISTON ROD ALIGNING AND CHECKING FIXTURE

John Thomas Lewis, San Diego, Calif.

Application April 15, 1954, Serial No. 423,367

11 Claims. (Cl. 33—46)

The present invention relates generally to machines for automotive maintainance and more particularly to a piston rod aligning and checking fixture.

Various types of piston rod aligners in present use have some form of clamp to hold a piston rod while a bending tool is used to correct misalignment. The piston rod is then removed and placed on a checking fixture to determine whether further correction is necessary. It is often necessary to clamp the piston rod in place for bending, remove the rod to the checking fixture and then return the rod for further bending several times before satisfactory results are achieved. This method of piston rod aligning requires a skilled operator and is time consuming.

Other types of piston rod aligners allow the piston rod to remain on the bending clamp while checking is carried out. However, the clamp is usually rotated to bring the piston rod into position in a checking fixture, or the fixture must be attached to the rod. In either case the actual alignment bending is guesswork and must be repeated to obtain accurate results.

It is the purpose of the present invention to introduce a piston rod aligning and checking fixture in which the aligning and checking are carried out simultaneously in a single operation and may be done by a relatively unskilled operator.

The primary object of this invention is, therefore, to provide a fixture on which piston rods may be aligned and checked simultaneously, the rods remaining fixed in one position for the entire operation.

Another object of this invention is to provide a fixture on which an accurate visual indication of the alignment of the rod is clearly visible to the operator, so that the aligning and checking can be carried out from one position.

Another object of this invention is to provide a fixture on which a projected image is reflected from a mirror carried on the piston rod and is returned to a target which is suitably marked to provide extremely accurate alignment of the piston rod.

Another object of this invention is to provide a fixture on which piston rods may be aligned and checked with or without their pistons attached.

Another object of this invention is to provide a fixture which is inexpensive and practicable to manufacture.

Finally, it is an object to provide a fixture of the aforementioned character which is simple, safe and convenient to operate, and which will give generally efficient and durable service.

With these and other objects definitely in view, this invention consists in the novel construction, combination and arrangement of elements and portions, as will be hereinafter fully described in the specification, particularly pointed out in the claims, and illustrated in the drawings which form a material part of this disclosure and wherein similar characters of reference indicate similar or identical elements and portions throughout the specification and throughout the views of the drawings, and in which:

Fig. 5 is a side elevation view of the fixture.

Fig. 6 is a sectional view taken on the line 6—6 of Fig. 5.

Fig. 7 is an enlarged sectional view taken on the line 7—7 of Fig. 2.

Fig. 8 is a perspective view of the reflector alignment jig for use with piston rods having pistons attached.

Fig. 9 is a side elevation view of the reflector alignment jig for use with piston rods having no pistons attached.

Fig. 10 is a sectional view taken on the line 10—10 of Fig. 9.

Figures 1, 2, 3, 4:
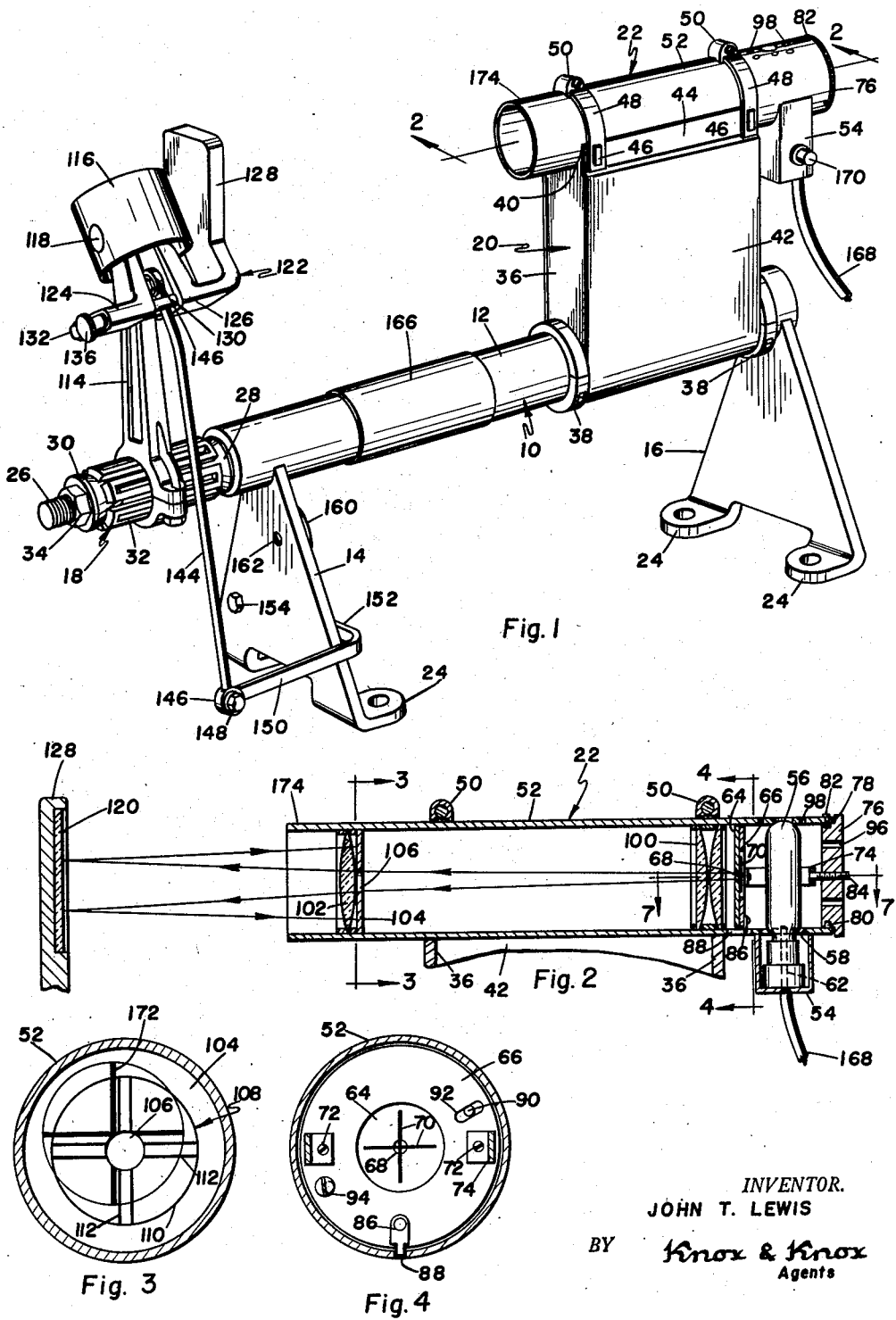
Fig. 1 is a perspective view of the aligning and checking fixture showing a piston rod in position with piston attached.
Fig. 2 is an enlarged sectional view taken on the line 2—2 of Fig. 1, showing the optical system of the fixture.
Fig. 3 is a sectional view taken on the line 3—3 of Fig. 2.
Fig. 4 is a sectional view taken on the line 4—4 of Fig. 2.

Referring now to the drawing, the fixture includes a stand 10 comprising a horizontal beam 12 supported at both ends by feet 14 and 16. At the forward end of the beam 12 is an expanding mandrel 18 on which the piston rods are secured. At the other or rear end of the beam 12 is an upwardly extending mounting 20 on top of which is secured a projector assembly 22, axially aligned with said beam.

The beam 12 is a substantially rigid member of tubular or solid bar construction and carries the working parts of the fixture. The feet 14 and 16 are firmly secured adjacent the ends of the beam 12 and extend downwardly to support the fixture at a convenient height, said feet having inwardly turned lugs 24 to facilitate attachment to a bench or the like.

The mandrel 18 is of conventional type and comprises a screwed rod 26 firmly secured in the forward end of the beam 12. Mounted on the screwed rod 26 and abutting the end of the beam 12 is a fixed cone 28, while slidably mounted on said rod is an adjustable cone 30. Supported between the cones 28 and 30 is a slotted expanding sleeve 32 which is clamped between the cones by a nut 34. The principle of the expanding mandrel is well known to those skilled in the art and need not be described in detail herein.

The mounting 20 may be of any suitable type, that shown in the drawings comprising a pair of end plates 36 secured to the beam 12 by clamps 38 in spaced relation. The upper ends of the end plates 36 have arcuate recesses 40 to receive the projector assembly 22. The mounting is enclosed by a side cover 42 extending beneath the beam 12 and upwardly on both sides of the end plates 36. At each upper end 44 of the end plates 36 are retaining blocks 46 which engage the ends of clamp straps 48 fitted over the projector assembly 22. The clamp straps 48 are provided with screw adjusters 50 of conventional type, so that the projector assembly may be held tightly in place.

The projector assembly 22, which is shown in Figs. 2, 3, 4 and 7, comprises a barrel 52 having at its rear end a lamp housing 54 containing a projection lamp 56. The lamp 56 extends into the barrel 52 through an opening 58, the sides of said opening having integral lugs 60, as shown in Fig. 7, so that the lamp housing 54 can be secured thereto by screws 62.

Positioned diametrically in the barrel 52 adjacent the lamp 56, is a graticule disc 64 mounted on a support ring 66. The graticule disc 64 has a small central aperture 68 over which are superimposed cross hairs 70. Fastened to the support ring 66 by means of screws 72 is a generally U-shaped bracket 74 which passes around the lamp 56, as shown in Figs. 2 and 7. Rotatably mounted in the rear end of the barrel 52 is an end disc 76 having a flange 78 extending beyond said barrel. The end disc 76 also has an annular groove 80 and is retained by set screws 82 passing through the barrel 52 and engaging said groove. Extending from the bracket 74 is an adjusting screw 84 which is screwed into the end disc 76 so that rotation of said disc shifts the support ring 66 and graticule disc 64 axially in the barrel 52. The support ring 66 is prevented from rotating in the barrel by a key 86 which extends downwardly into a longitudinal slot 88 in said barrel.

In order to align the cross hairs 70 on the axis of the projector assembly 22, the graticule disc 64 is keyed to the support ring 66 by a pin 90 riding in a substantially radial slot 92 as shown in Fig. 4. For accurate adjustment the graticule disc 64 has an eccentric screw 94 therein also engaging the support disc 66, so that by rotation of said eccentric screw, the axial alignment of the cross hairs 70 may be accomplished accurately. Once the alignment is set, the graticule disc 64 and support ring 66 are clamped together by tightening the screws 72 holding the bracket 74. The screws 72 pass through enlarged holes in the disc 66 to allow for adjustment of the disc 66.

In order to prevent overheating of the lamp 56, the end disc 76 and the portion of the barrel 52 above said lamp are provided with suitable vents 96 and 98 respectively.

Positioned in the barrel 52 ahead of the graticule disc 64 are condenser lenses 100 such as are used in conventional projectors and the like. Adjacent the opposite end of the barrel 52 is a projection lens 102, while against the rear face of said projection lens is a target disc 104 having a central aperture 106. On the forward face of the target disc 104 is a marked target 108, comprising a ring 110 concentric with the aperture 106 and an open cross 112 centered on said aperture. The open cross 112 is composed of pairs of parallel lines extending substantially diametrically across the ring 110, as shown in Fig. 3.

The alignment of a piston rod is checked by inspection of an image projected from the projector assembly 22, the image being reflected from a mirror mounted on the piston rod and superimposed on the target disc 104, in relation to the marked target 108. As shown in Figs. 1, 5 and 6 of the drawings, a typical piston rod 114 is clamped in an upright position on the mandrel 18, the piston rod having a piston 116 attached thereto by means of its wrist pin 118. The piston and piston rod assembly is thus exactly as removed from an engine.

The operation of aligning a piston rod is that of aligning the wrist pin bore axially with the crankpin bore. In the present fixture, the crankpin bore is accurately aligned on the mandrel 18, thus by mounting a mirror on the piston rod in alignment with the wrist pin bore, the position of the reflected image on the target disc 104 will indicate the misalignment, if any, of the rod.

In order to align a mirror accurately with the wrist pin bore of a piston rod having a piston attached, the mirror 120 is carried in an alignment jig 122 which is located against the wrist pin 118 itself. This alignment jig 122 comprises a pair of generally L-shaped blocks 124 and 126, the block 126 having an upright mirror holder 128 extending therefrom. Secured in the block 126 are a pair of spaced parallel guide pins 130 on which the block 124 slides, the ends of said pins being interconnected by a tie plate 132. Journalled in the tie plate 132 is a clamp screw 134, which is screw threaded into the block 124 and has a hand knob 136. Secured to both of the blocks 124 and 126 and extending upwardly therefrom are V plates 138 having V-shaped notches 140 in their upper ends. The upper ends of the V plates 138 are spot faced as indicated at 142 to reduce their thickness locally. The alignment jig 122 is, of course, mounted beneath the piston 116 with the V plates 138 extending into the piston and bearing against the wrist pin 118 on each side of the piston rod 114 as shown in Fig. 6, the mirror 120, in this position, being exactly at right angles to the wrist pin. The gap between the blocks 124 and 126 is adjusted by means of the clamp nut 134 to suit the particular piston so that both V plates 138 seat firmly on the wrist pin. The reduced thickness of the V plate ends is necessary to accommodate certain types of piston assemblies in which the clearance between the piston rod and the faces of the internal wrist pin bosses is very limited. The construction of the piston and its assembly is well known to those skilled in the art and need not be shown in detail in the drawings.

The alignment jig 122 is secured to the upper end of a support rod 144, said rod having a ball end 146 which is attached to the inner face of the block 126 by a bolt 148. The lower end of the support rod 144 also has a ball end 146 which is secured by a further bolt 148 to the end of the forwardly projecting portion 150 of a torque arm 152. This torque arm 152 is pivotally attached to the foot 14 by a bolt 154, said torque arm having a generally U-shaped end 156 which is journalled on said bolt. The torque arm 152 is biased by a coil spring 158, one end of which is secured to the bolt 154 and the other end secured to the U-shaped end 156. Thus the support rod 144 carrying the alignment jig 122 is biased upwardly, so that the V plates 138 are held firmly in place against the wrist pin 118, as shown in Fig. 6. To limit the upward movement of the torque arm 152 when not in use, a resilient bumper 160 is secured to the foot 14 by a bolt 162 and nut 164. Also, when not in use, the support rod 144 and alignment jig 122 may be lowered to rest across the beam 12, a pad sleeve 166 being fitted around said beam for protection of the assembly.

To use the fixture, a piston rod and piston assembly is clamped on the mandrel 18 and the alignment jig 122 is set in place with the mirror 120 facing the projector assembly 22, as shown in the drawings. The lamp 56 is then turned on, said lamp, of course, being connected to a source of power by a conductor 168 and controlled by a switch 170. An image of the cross hairs 70 superimposed on a circle of light is thus projected through the aperture 106 onto the mirror 120 and is reflected back to the target disc 104, the path of the light rays being shown in Fig. 2. Should the piston rod 114 be bent or twisted the reflected image, indicated at 172 in Fig. 3, will not fall exactly within the target 108. The position of the reflected image 172 shows that the piston rod has a slight bend, which raises the image above the target 108, and also has a slight twist which throws the image to one side of said target. The operator, who stands near the piston rod 114, is able to see the target disc 104 clearly, the end portion of the barrel 52 serving as a shroud 174 to exclude stray light which may interfere with the interpretation of the image.

Using a conventional rod bending tool, not shown, the operator may bend or twist the piston rod 114 to bring the reflected image 172 exactly within the bonds of the marked target 108. An extremely important feature is the fact that the operator can actually view the target while working on the piston rod, so that guesswork is entirely eliminated. In addition, because the plane of the mirror 120 is at right angles to the axis of the wrist pin 118, the wrist pin itself need not be in exact axial alignment with the projector assembly 22. In fact the piston rod 114 may be aligned in an upright position with sufficient accuracy by eye alone.

The configuration of the target 108 utilizing both circular and cross patterns, enables the operator to bring the circular light spot of the reflected image within the ring 110, after which the final adjustments may be made to the piston rod to bring the shadow of the cross hairs precisely within the marked open cross 112.

In certain instances it may be necessary to check piston rods from which the pistons have been removed. In such instances a simplified alignment jig 176 may be used as shown in Figs. 9 and 10. This alignment jig 176 comprises an open frame 178 having parallel side bars 180 which are interconnected by end brackets 182. Secured to one end of the frame 178 is a mirror holder 184 containing a mirror 186.

To use the alignment jig 176 the piston rod 114 is mounted on the mandrel 18 and is fitted with a wrist pin 118 or a suitable substitute therefor, the alignment jig being attached to said wrist pin to ensure accurate alignment with the wrist pin bore. The end brackets 182 have inverted V-shaped notches 188 and are provided with locating pins 190 projecting inwardly from the faces of said notches. The locating pins 190 rest on the wrist pin 118 as shown in Fig. 10 and are accurately ground to position the alignment jig 176 in exact axial alignment with said wrist pin.

The alignment jig 176 is held in place by generally U-shaped retaining clips 192 pivotally mounted between the end brackets 182. The upper portions of the retaining clips 192 are biased outwardly by tension springs 194 secured thereto, the other ends of said springs being fastened in sockets 196 in the side bars 180 by means of pins 198. The lower ends of the retaining clips 192 have arcuate depressions 200 which engage beneath the wrist pin 118 and hold the same firmly in place against the locating pins 190. The method of aligning and checking the piston rod is identical to that previously described.

The fixture may be used to align and check virtually all common sizes of piston rods, the mandrel 18 being easily interchangeable to accommodate the various size ranges. Similarly, both of the alignment jigs 122 and 176 are adaptable to many sizes and types of piston rods. The relatively long distance between the mirror and the target disc 104 provides a considerable geometric magnification of misalignment of the piston rod. Thus the alignment may be corrected and checked with far more accuracy than is possible with other types of fixtures. Furthermore, due to the extreme simplicity of the fixture and the method of alignment and checking, the device may be used efficiently and rapidly by a relatively unskilled operator.

The operation of this invention will be clearly comprehended from a consideration of the foregoing description of the mechanical details thereof, taken in connection with the drawings and the above recited objects. It will be obvious that all said objects are amply achieved by this invention.

Further description would appear to be unnecessary.

It is understood that minor variation from the form of the invention disclosed herein may be made without departure from the spirit and scope of the invention, and the drawings and specification are to be considered as merely illustrative rather than limiting.

I claim:

1. A piston rod aligning and checking fixture comprising a stand having at one end a clamp extending axially through a crankshaft bore of a piston rod for holding the piston rod with its crankshaft bore in a fixed position relative to the stand, a mirror having means for mounting the same substantially at right angles to and adjacent to the wrist pin bore axis of a piston rod, a projector fixed on said stand and having its axis in spaced parallel relation to the axis of said clamp and image producing means positioned to project an image onto said mirror so that the image is reflected back toward the projector, and a target aligned with said projector between said mirror and said image producing means, said target being opaque and facing said mirror to receive the reflected image, and said target having an aperture to allow light rays to pass therethrough from said means to said mirror.

2. A piston rod aligning and checking fixture comprising a stand having at one end a clamp extending axially through a crankshaft bore of a piston rod for holding the piston rod with its crankshaft bore in a fixed position relative to the stand, a projector fixed on said stand and having its axis in spaced parallel relation to the axis of said clamp and positioned to project an image toward the piston rod, a mirror having alignment means thereon for holding the same at right angles to and adjacent to the wrist pin bore of the piston rod, said mirror being positioned to reflect the image back toward said projector, and a target in said projector adjacent the end thereof proximate to said mirror to receive the reflected image, said target facing and being visible from a viewpoint adjacent the piston rod.

3. A piston rod aligning and checking fixture comprising a stand having at one end a clamp extending axially through a crankshaft bore of a piston rod for holding the piston rod with its crankshaft bore in a fixed position relative to the stand, a projector fixed on said stand and having its axis in spaced parallel relation to the axis of said clamp and positioned to project an image toward the piston rod, a mirror having alignment means thereon for holding the same at righ angles to and adjacent to the wrist pin bore of the piston rod, said mirror being positioned to reflect the image back toward said projector, and a target in said projector adjacent the end thereof proximate to said mirror to receive the reflected image, said target having demarcations corresponding to the image for positional comparison therewith, and said target facing and being visible from adjacent the piston rod.

4. A piston rod aligning and checking fixture comprising a stand having at one end a clamp extending axially through a crankshaft bore of a piston rod for holding the piston rod with its crankshaft bore in a fixed position relative to the stand, a projector fixed on said stand remote from said clamp and having its axis in spaced relation to the axis of said clamp, said projector comprising a barrel having therein a light source, an image defining graticule mounted in said barrel in front of said light source, and lens elements mounted in said barrel for projecting the image of said graticule toward the piston rod, a mirror having alignment means thereon for holding the same at right angles to and adjacent to the wrist pin bore, said mirror being positioned to reflect the image back toward said projector adjacent the end thereof proximate to said mirror, and a target in said projector to receive the reflected image, said target having demarcations corresponding to the image for positional comparison therewith, and said target facing and being visible from adjacent the piston rod.

5. A piston rod aligning and checking fixture comprising a stand having at one end a clamp extending axially through a crankshaft bore of a piston rod for holding the piston rod with its crankshaft bore in a fixed position relative to the stand, a projector on said stand remote from said clamp and having its axis in spaced relation to the axis of said clamp, said projector comprising a barrel having therein a light source, an image producing graticule mounted in said barrel in front of said light source axially adjustable in said barrel, eccentric adjustment means for axially aligning the graticule, lens elements for projecting the image of said graticule toward the piston rod, a mirror having alignment means thereon for holding the same at right angles to and adjacent to the wrist pin bore of the piston rod being checked, said mirror being positioned to reflect the image back toward said projector, and a target in said projector to receive the reflected image, said target having demarcations corresponding to the image for comparison therewith, and said target facing and being visible from adjacent the piston rod.

6. A fixture according to claim 4, wherein said graticule comprises a disc having a central aperture, and cross hairs transposed on said aperture, whereby the reflected image constitutes a lighted circular area having a cross-like shadow therein.

7. A piston rod aligning and checking fixture comprising a stand having at one end a clamp for holding a wrist pin equipped piston rod in a generally upright position with its crankshaft bore in a fixed position relative to said stand and its wrist pin end uppermost, a projector on said stand remote from said clamp and aligned to project an image toward the wrist pin end of a piston rod held by said clamp, a mirror having attachment means thereon for engaging a wrist pin to hold said mirror at right angles thereto, said mirror being positioned to reflect the image back toward the projector, and a target in said projector to receive the reflected image, said target facing and being visible from a viewpoint adjacent the piston rod.

8. A fixture according to claim 7, wherein said attachment means includes a mirror carrying frame structure having V-notches to receive a wrist pin, and resilient clamping means for holding said frame on a wrist pin.

9. A fixture according to claim 7, wherein said attachment means includes slidably connected blocks, one of said blocks carrying said mirror, said blocks having V-notched plates thereon for engaging a wrist pin on each side of a piston rod, and screw means for adjusting the spacing of said blocks.

10. A fixture according to claim 7, wherein said attachment means includes slidably connected blocks, one of said blocks carrying said mirror, said blocks having V-notched plates thereon for engaging a wrist pin on each side of a piston rod, screw means for adjusting the spacing of said blocks, and biased support means attached to said blocks to hold said plates firmly against a wrist pin.

11. A fixture according to claim 7, wherein said attachment means includes a frame having spaced V-blocks thereon for engaging a wrist pin on both sides of a piston rod, spring biased clips for engaging a wrist pin to hold the frame firmly on said V-blocks, said mirror being mounted at one end of said frame.

References Cited in the file of this patent

UNITED STATES PATENTS

| | | |
|---|---|---|
| 1,331,003 | Daniels | Feb. 17, 1920 |
| 1,419,452 | Fraser | June 13, 1922 |
| 1,564,654 | Weaver | Dec. 8, 1925 |
| 2,342,828 | Armitage et al. | Feb. 29, 1944 |
| 2,402,856 | Turrettini | June 25, 1946 |
| 2,436,892 | Hunter | Mar. 2, 1948 |
| 2,541,318 | Woodward | Feb. 13, 1951 |
| 2,577,807 | Pryor | Dec. 11, 1951 |

FOREIGN PATENTS

| | | |
|---|---|---|
| 243,141 | Switzerland | Dec. 2, 1946 |